United States Patent Office.

THE UNION SUGAR REFINERY, OF CHARLESTOWN, MASSACHUSETTS, ASSIGNEES OF GUSTAVUS A. JASPER.

*Letters Patent No.* 53,534, *dated March* 27, 1866; *reissue No.* 2,778, *dated October* 15, 1867.

IMPROVEMENT IN CLEANSING ANIMAL CHARCOAL.

The Schedule referred to in these Letters Patent and making part of the same.

TO ALL PERSONS TO WHOM THESE PRESENTS SHALL COME:

Whereas GUSTAVUS A. JASPER, of Charlestown, of the State of Massachusetts, did invent a new and useful Process of Cleansing Animal Black or Bone-Charcoal, after or before its use, for the purpose of filtering a saccharine sirup, and apply for a patent on such invention to be granted to the Union Sugar Refinery, of the said Charlestown, and such patent was duly granted to the said Union Sugar Refinery, a corporation legally organized, and is numbered 53,534; and whereas application has been made by me, PHILO S. SHELTON, of Boston, of the State aforesaid, president of the said corporation, for the reissue of such patent, on an amended specification and claim: Now, therefore, I, the said PHILO S. SHELTON, as president of the said corporation, and for and in behalf of the same, do hereby declare the following to be a full and correct specification of the said invention of the said JASPER.

In carrying out the invention, a suitable wooden or metal tank—say, of capacity sufficient to hold one filter charge of charcoal—is to be employed. This tank, which may be four or five feet high, is to be constructed with a partition parallel with and raised a few inches above its bottom, such partition being foraminous, or perforated with numerous holes, and covered with a blanket to prevent the escape of the charcoal.

A pipe for discharging water into the space below the perforated partition, and causing it to flow up, through, and out of the tank, is applied to the tank. Another such pipe is also employed to discharge water into the upper part of the tank. These pipes are to be provided with suitable stop-cocks, so that water may be admitted to the charge in the tank, either from below or on top of it, as may be desirable, in cleansing the coal. There may also be an overflow or waste-passage at the upper part of and in one side of the tank.

A suitable pipe or apparatus for the admission of steam, or for causing the water when in the tank to boil, is to be connected with the tank, and there should be at the bottom of the tank an opening or stop-cock for the escape of the water, when it may be desirable to draw it off, such opening being kept plugged at other times.

Muriatic or acetic acid is to be used for neutralizing the lime in the charcoal, but as the amount to be employed will depend upon the quantity of lime contained in the coal, it is necessary only to state that but a little acid is required in this process, one part of acid to four parts of lime being sufficient usually. Care must be taken not to use an excessive amount of the acid, as this will injure the coal.

The process of treatment is as follows: Place in the tank a proper quantity of acid and water to cover the coal when thrown into the tank. The tank is next to be supplied with charcoal to within two or three inches of the top, care being taken to have all the coal covered by the water. The acid solution is next to be caused to boil. The most economical mode of accomplishing the boiling of it is by introducing a jet of steam through a pipe leading into the space below the foraminous partition. The process of boiling is to be continued for about one-half hour to an hour, during which time the coal will be so put in motion that the impurities or extraneous matter will rise to the top of it, and, with a portion of the water, will flow out the waste-opening at the upper part of the tank. Next the water should be tested, and if the alkali of the coal has been neutralized by the acid, the steam is to be shut off, and cold, clear water should be admitted from below the charge and allowed to escape at the top of it, until the temperature of the coal may be the same as the water thus entering. The flow of water having been stopped, heat should again be applied, as before, to the body of charcoal and the water, which should be boiled from ten to fifteen minutes. This boiling is for the purpose of setting free any remaining impurities in the coal. The water is next to be drawn off, and cold water should be again admitted from below, and allowed to flow through the charge, and until such water may run off free from impurities. Next, the flowage of the water should be stopped, and that remaining in the tank should be drawn off. The tank should again be filled with water from the pipe at its top. The hole at the bottom of the tank being opened, water should be allowed to run down through the charge until such water may run clean from the hole. The charcoal will then be ready for being reburned.

The said process is particularly advantageous with respect to others employed for the purpose. The ordinary treatment of the coal with a cold solution of acid, or of acid gas, does not thoroughly act upon the impurities taken out of the sugar, and these impurities being carbonized in the retort, remain mixed with the coal, and diminish its decolorizing power. Secondly, most, if not all, the former processes are very long, requiring several days to be effective, and also necessitating the erection of large tanks, in order to treat enough coal to meet the daily requirement of a sugar refinery.

By the process of the said JASPER the coal, after being reburned, is left in the best condition for decolorizing, and, as the time required to carry through such process is but a few hours, a very small apparatus is sufficient to receive and thoroughly cleanse each filter-charge of charcoal when it becomes necessary. From the fact that the coal is so thoroughly purified, it requires less time in reburning in the retorts, and hence there is a saving of time, expense, and working capacity of the kilns.

The accompanying drawing serves to illustrate the apparatus used in carrying out the said process.

In this drawing, A is the tank; B, the water-conduit for introducing water, under pressure, into the lower part of the tank; *a* is the foraminous partition; *b*, a branch pipe leading from the pipe B into the upper part of the tank; *c* and *d* are stop-cocks; *e*, the overflow or waste-hole; *f*, the discharge opening at the bottom of the tank. C is the steam pipe for introducing steam into the tank, such pipe being supposed to lead from a steam-generator, and to be provided with a stop-cock, *g*.

When animal charcoal has been used for the decolorization and purification of sugar solutions, and requires cleansing, as described, the process of boiling it in water only, without the acid, will answer the purpose. Acid is requisite only when lime has to be liberated from the charcoal, but after extraction or neutralization of the lime, or when the charcoal is without lime, it can be relieved from all the other impurities by the process of boiling it in water and washing it, as described. When charcoal has been thoroughly cleansed in the manner as described it can be used without the necessity of reburning as it has been and is now practised. It has been found that by simply drying the charcoal in retorts, or any suitable vessel for that purpose, it will decolorize sugar solutions as perfectly as charcoal that has been reburned.

Previous to the invention of the said JASPER it had been customary to employ steam, water, and an acid for the purpose of revivifying charcoal used in filters, therefore such is not claimed as used in the manner or modes heretofore practised. The washing of the charcoal by reversed currents of water introduced into the filter, in connection with steam, water, and an acid therein also used, constitutes a subject of a patent recently granted to the said JASPER, and, consequently, is not herein claimed, such having been claimed in the said patent.

The present invention differs from all these last mentioned, inasmuch as it involves the boiling of the acidulated solution, or liquid holding the charcoal, and thereby so sets in motion the particles of the carbon as to thoroughly or very effectively neutralize the alkali, and separate from them the foreign matters, and cause such matters to rise and be floated off or expelled from the mass. Furthermore, the present invention is particularly advantageous for treating bone-charcoal before being used in a filter, as this preparative treatment renders it a much better decolorizer than it is in its natural state.

I herein claim, as the invention of the said JASPER, the new or improved process, substantially as hereinbefore described, for treating charcoal, either after or before its use in a filter, for the cleansing of a saccharine or other liquid, the same consisting in boiling the charcoal in an acid solution and washing it, the whole being essentially as specified.

I also claim, as the invention of the said JASPER, for removal from the charcoal of the gummy and other matter, except the lime or alkaline matter, the treatment or process of treating the charcoal without the use of acid, the same consisting in boiling the charcoal in water, or so boiling it and washing it, the charcoal being subsequently dried, as set forth.

PHILO S. SHELTON,
*President of the Union Sugar Refinery.*

Witnesses:
R. H. EDDY,
F. P. HALE, Jr.